United States Patent [19]
Kato et al.

[11] Patent Number: 6,163,371
[45] Date of Patent: Dec. 19, 2000

[54] DISTANCE MEASURING APPARATUS

[75] Inventors: Masahiko Kato, Akiruno; Takahiro Yamanishi, Echi-gun, both of Japan

[73] Assignees: Olympus Optical Co., Ltd.; Takata Corporation, both of Tokyo, Japan

[21] Appl. No.: 09/307,439

[22] Filed: May 10, 1999

[30] Foreign Application Priority Data

May 13, 1998 [JP] Japan .................................. 10-130485

[51] Int. Cl.⁷ ................................ G01C 3/08; G01C 5/00
[52] U.S. Cl. .......................................... 356/4.03; 356/3.11
[58] Field of Search .................................. 356/4.03, 3.11

[56] References Cited

U.S. PATENT DOCUMENTS

| | | |
|---|---|---|
| 3,721,499 | 3/1973 | Narbaits-Jaureguy . |
| 4,801,201 | 1/1989 | Eichweber . |
| 5,519,489 | 5/1996 | McClenahan et al. ............ 356/139.09 |

FOREIGN PATENT DOCUMENTS 5-100029   4/1993   Japan .

*Primary Examiner*—Stephen C. Buczinski
*Attorney, Agent, or Firm*—Frishauf, Holtz, Goodman, Langer & Chick, P.C.

[57] ABSTRACT

A distance measuring apparatus includes a light transmission optical system for transmitting a light beam having intensity distribution with a pair of peaks, and a reception system for measuring a distance to an obstacle on the basis of reflected light from the obstacle. The light transmission optical system has a pair of light transmission units for transmitting two light beams, each having a Gaussian intensity distribution, and composition of the two light beams forms the light beam having the intensity distribution with the pair of peaks. The light transmission units are arranged at positions near both ends of a front portion of an automobile, to transmit the two light beams in parallel from the positions. An interval between the peaks is a distance corresponding to an area in which the degree of danger to life is high in a collision against the obstacle, i.e. about 1 m. And the feet of the light intensity distribution with the pair of peaks fall within the width of the automobile.

15 Claims, 5 Drawing Sheets

DISTANCE MEASURING APPARATUS

BACKGROUND OF THE INVENTION

The present invention relates to a distance measuring apparatus for measuring a distance to an obstacle such as an automobile or motorcycle, a person, a structure or building beside a road or the like, on the basis of the reflected light from the obstacle, caused by irradiation of a light beam from the apparatus.

Such a distance measuring apparatus is used for a "following" distance sensor or an auto-cruising system. Generally, the distance measuring apparatus has a light transmission optical system for transmitting a fixed or scanned light beam and a reception system for receiving the light reflected from the obstacle, so as to measure the distance to the obstacle by counting the time in which the light moves between the apparatus and the obstacle. The light beam transmitted from the light transmission optical system generally has a Gaussian light intensity distribution or the like, in which the intensity is largest at the center, and becomes reduced as the distance from the center is increased.

When the obstacle crosses the light beam having the Gaussian light intensity distribution or the like, stable measurement is executed after transitionally unstable measurement has been executed. As the obstacle overlaps a part of the light beam, dispersion in the measurement values is large since the quantity of the scattered light is insufficient. As the rate of the obstacle crossing the light beam becomes larger, the quantity of the scattered light becomes increased and stable measurement can be executed with little dispersion.

When the monitoring area is a middle distance or a long distance, there is enough time in collision of mobiles moving at a high speed, and measurement can be executed sufficiently by software processing such as statistical processing of the measurement data.

However, if the movement of the obstacle including another moving body is kept until the moment immediately before a collision to avoid the collision or drive a life saving device, the monitoring area needs to be also a short distance, and the width of an own vehicle or a running lane needs to be also monitored.

The short distance indicates, herein, a distance of up to about 30 m. From a distance of 30 m, for example, automobiles running at 50 km/h collide in about one second, and automobiles running at 100 km/h collide in 0.5 second. The movement of a moving body in 10 m particularly has great influence in terms of avoidance of the collision or drive of a life saving device.

In such a case, it is preferable that the transitionally unstable measurement time mentioned above should be as short as possible.

Incidentally, an area for monitoring the obstacle is demanded to be as large as possible. On the other hand, a small monitoring area has an advantage that an algorithm for judging the danger of the collision may be simplified. In consideration of these factors, the monitoring area is, for a short distance as mentioned above, preferably the width of an own automobile.

Generally, the degree of danger of life is high in the collision against an obstacle in a 1 m range with respect to the center of the width of an automobile, and low in the collision against an obstacle out of the range, so called, in an offset state.

When the monitoring area is set as described above, the transitionally unstable measurement time mentioned above is required to be as short as possible. In addition, it is requested that this should be implemented at costs that are as low as possible.

BRIEF SUMMARY OF THE INVENTION

The present invention aims to provide a distance measuring apparatus in which a transitionally unstable distance measurement time is shortened at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The fundamental principle of the present invention will be explained with reference to FIGS. 17 and 18.

Figure 17:
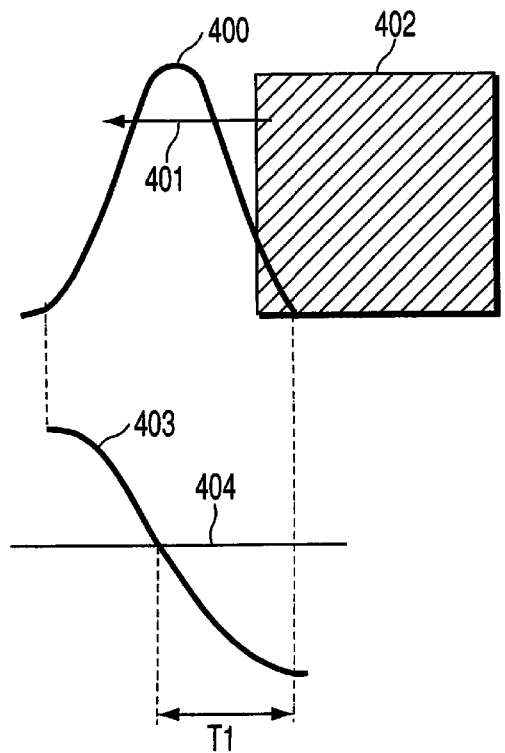
FIG. 17 is a view showing a situation in which an obstacle crosses the light beam having the Gaussian light intensity distribution and a situation in which the quantity of light scattered by the obstacle is varied.

FIG. 17 shows a light beam having a Gaussian light intensity distribution 400, which is crossed by an obstacle 402 advancing in a direction of an arrow 401 crosses, and the quantity of light 403 scattered by the obstacle 402, which varies in accordance with the position of the obstacle 402. The distance measuring apparatus obtains stable measurement data with respect to the quantity of light higher than a threshold value 404. That is, transitionally unstable measurement is executed during a period T1 from time when the obstacle 402 reaches the edge of the light beam to time when the quantity of the scattered light exceeds the threshold value.

Figure 18:
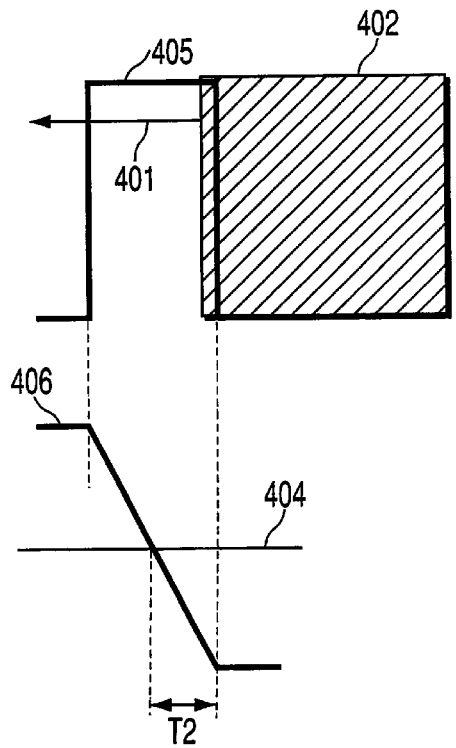
FIG. 18 is a view showing a situation in which an obstacle crosses the light beam having the rectangular light intensity distribution with the same quantity of light as that of the light beam shown in FIG. 17 and a situation in which the quantity of light scattered by the obstacle is varied.

FIG. 18 shows a light beam having the same quantity of light as that of the light beam shown in FIG. 17, but having a rectangular light intensity distribution 405, which is crossed by the obstacle 402 advancing in the direction of the arrow 401, and the quantity of light 403 scattered by the obstacle 402, which varies in accordance with the position of the obstacle 402. As understood from comparison to FIG. 17, a period T2 in which a transitionally unstable measurement of this case is executed is remarkably shorter than the period T1. It can be understood that the period for the transitionally unstable measurement is made shorter by varying the light intensity distribution of the light beam as mentioned above.

Figure 1:
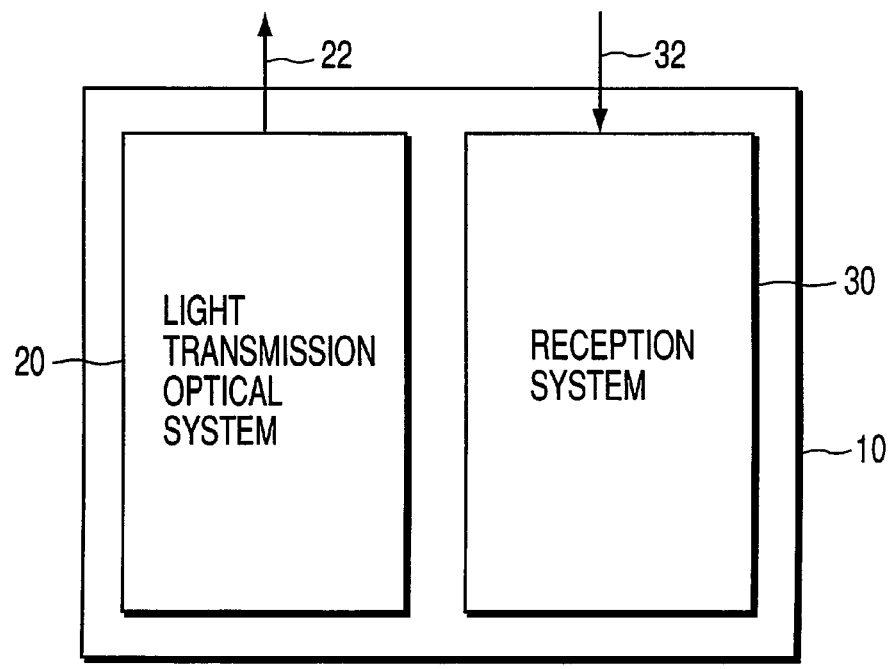
FIG. 1 shows a basic structure of a distance measuring apparatus according to the present invention.

The present invention is accomplished on the basis of this consideration, and a distance measuring apparatus 10 comprises a light transmission optical system 20 for transmitting a light beam 22 which has the light intensity distribution with a pair of peaks, and a reception system 30 for measuring the distance to the obstacle on the basis of light 32 reflected from the obstacle, as shown in FIG. 1. Positions of a pair of peaks of the light beam 22 correspond to both ends of an area, respectively, in which the degree of danger of life is high in the collision against the obstacle. For example, the light beam has a peak interval of about 1 m at a position 30 m ahead. The reception system 30 has, for example, a lens for condensing the reflected light 32 and a light receiving element for outputting an electric signal corresponding to the quantity of the reflected light 32.

[First Embodiment]

Figure 2:
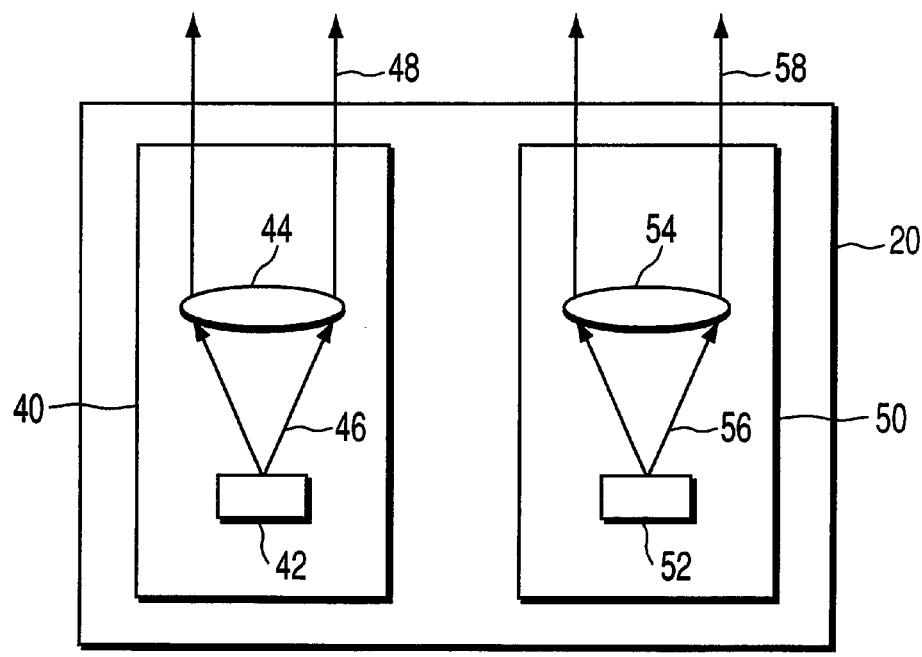
FIG. 2 schematically shows the structure of the distance measuring apparatus according to the first embodiment of the present invention.

The distance measuring apparatus according to the first embodiment has a light transmission optical system 20, which has a pair of light transmission units 40 and 50 for transmitting light beams 48 and 58 having the Gaussian light intensity distribution, as shown in FIG. 2. Composition of the two light beams 48 and 58 forms the light beam 22 having the above-mentioned light intensity distribution with a pair of peaks. For example, the light transmission units 40 and 50 have, respectively, light sources 42 and 52 for emitting divergent light beams 46 and 56 having the Gaussian intensity distribution, and collimating lenses 44 and 54 for converting the divergent light beams 46 and 56 into parallel light beams 48 and 58.

Figure 3:
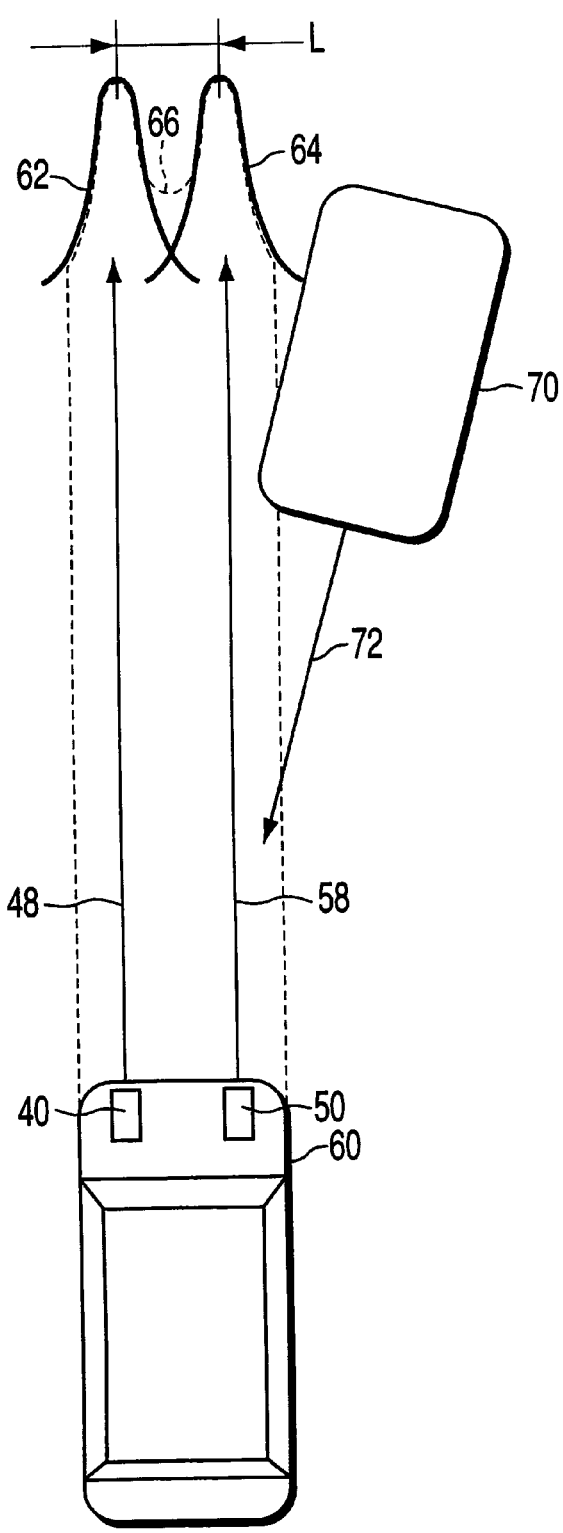
FIG. 3 shows an example of a vehicle on which a pair of light transmission units shown in FIG. 2 are built.

As an example, a pair of light transmission units 40 and 50 are arranged near both ends of a front portion of an automobile 60 to transmit two parallel light beams 48 and 58 toward the front side, as shown in FIG. 3. The light beams 48 and 58 have the Gaussian light intensity distributions 62 and 64, and an interval of their peaks 30 m ahead of an automobile 60 is a distance L corresponding to an area in which the degree of danger to life is high in the collision against the obstacle, i.e. about 1 m. Outer feet of the light intensity distributions of the light beams 48 and 58, i.e. the outer feet of a light intensity distribution 66 of a light beam formed by composition of the two light beams 48 and 58, almost fall within the width of the automobile 60. An obstacle 70 approaching the automobile 60 relatively in a direction of an arrow 72 is assumed here. When the obstacle 70 enters an area in which the degree of the danger to life is high in the collision, the obstacle 70 crosses the peak of the intensity distribution 64 of the light beam 58. At this time, the measurement of the distance is changed from a transitionally unstable one to a stable one. In other words, the stable measurement of the distance is quickly started. Further, in a case where the obstacle 70 enters the running path from the left side of the advancing direction of the automobile 60, when the obstacle 70 enters an area in which the degree of the danger to life is high in the collision, the obstacle 70 crosses the peak position of the intensity distribution 62 of the light beam 48. At this time, the measurement of the distance becomes stable.

Since the outer feet of the light intensity distributions 62 and 64 of the light beams 48 and 58, i.e. the feet of the light intensity distribution 66 of the light beam formed by composition of the two light beams 48 and 58, almost fall within the width of the automobile 60, an area in which the degree of the danger to life is relatively low, that is, an area outside the width of the automobile, is not monitored, and the transitionally unstable period is short.

Figure 4:
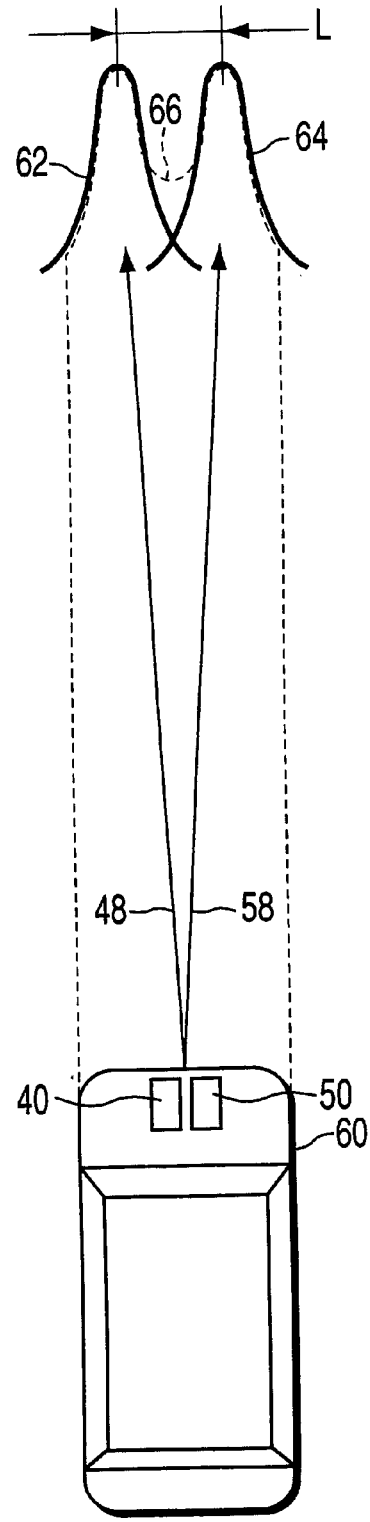
FIG. 4 shows another example of a vehicle on which a pair of light transmission units shown in FIG. 2 are built.

As another example, a pair of light transmission units 40 and 50 are arranged at the center of the front portion of the automobile 60 to transmit two light beams 48 and 58 toward the slightly outer front side, as shown in FIG. 4. An angle between directions of the two light beams 48 and 58 is set such that the peak interval of the intensity distributions 62 and 64 at a position 30 m ahead of the automobile 60 is the distance L corresponding to an area in which the degree of the danger to life is high in the collision against the obstacle, i.e. about 1 m.

Further, the feet of the light intensity distribution 66 of the light beam formed by composition of the two light beams 48 and 58 fall within the width of the automobile 60, about 30 m ahead of the automobile 60.

Therefore, at the time when the obstacle 70 enters the area in which the degree of the danger to life is high, the measurement of the distance is changed from a transitionally unstable one to a stable one, in quite the same manner as that of FIG. 3. Since the outer feet of the light intensity distributions 62 and 64 of the light beams 48 and 58, i.e. the feet of the light intensity distribution 66 of the light beam formed by composition of the two light beams 48 and 58, almost fall within the width of the automobile 60, an area in which the degree of the danger to life is relatively low, that is, an area outside the width of the automobile, is not monitored, and the transitionally unstable period is short.

Since a pair of light transmission units 40 and 50 may be assembled together as one body, and, if desired, the reception system may also be incorporated, this structure is advantageous in light of costs, but the monitoring area is narrow near the automobile 60.

[Second Embodiment]

The distance measuring apparatus of a second embodiment has a light transmission optical system, which forms a light beam with a pair of edges emphasized, by splitting a single light beam having the Gaussian intensity distribution into two light beams and reconstructing them, and transmits the reconstructed light beam. This light beam having the emphasized edges corresponds to the above-mentioned light beam 22 having the light intensity distribution with a pair of peaks. Therefore, in the light transmission optical system of the present embodiment, composition of the two split light beams forms the above-mentioned light beam 22 having the light intensity distribution with a pair of peaks.

First, the light beam having the emphasized edges, and then a specific structure of the light transmission optical system for transmitting the light beam having the emphasized edges, will be explained below.

Figure 5:
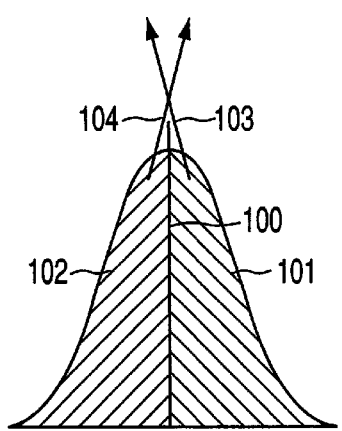
FIG. 5 shows intensity distribution of light beam at a pupil unit of a light transmission optical system, in a distance measuring apparatus according to the second embodiment.

FIG. 5 shows the Gaussian light intensity distribution of the light beam at a pupil portion of the light transmission optical system.

The light beam is split into a right half 101 and a left half 102 with reference to an optical axis 100. The right half 101 is transmitted in a direction of an arrow 103, and the left half 102 is transmitted in a direction of an arrow 104.

Figure 6:
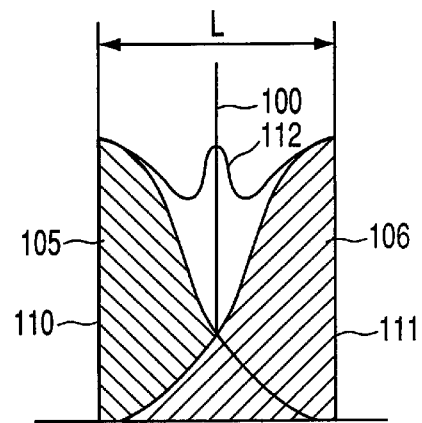
FIG. 6 shows intensity distribution of light beam about 30 m ahead of the light transmission optical system, in a distance measuring apparatus according to the second embodiment.

FIG. 6 shows the intensity distribution of the light beam remote in the above-mentioned small distance, i.e. about 30 m along the optical axis 100 of the light transmission optical system. An intensity distribution 105 of the left side, which is formed by propagation of the right half 101 of the light beam, has an intensity distribution having an acute edge 110, where expansion and deformation of the waveform caused by diffraction are ignored for simple explanation. Similarly, an intensity distribution 106 of the right side, which is formed by propagation of the left half 102 of the light beam, has an intensity distribution with an acute edge 111. Therefore, the light beam has an intensity distribution 112 having steep edges at both sides, which corresponds to the sum of the left intensity distribution 105 and the right intensity distribution 106.

The interval between the peak of the left intensity distribution 105 and the peak of the right intensity distribution 106 is a distance L corresponding to an area in which the degree of the danger to life is high in the collision against the obstacle, i.e. about 1 m. That is, an angle between directions of the right half 101 and the left half 102 of the light beam shown in FIG. 5 is, for example, 3 degrees so as to obtain the intensity distribution 112 shown in FIG. 6, at a position 30 m ahead.

As can be assumed easily from comparison of the intensity distribution 112 shown in FIG. 6 with the Gaussian intensity distribution shown in FIG. 5, when an obstacle crosses the reconstructed light beam, i.e. the light beam having the intensity distribution 112, scattered light of enough intensity is generated more quickly. In other words, a period of the transitionally unstable measurement is remarkably shortened.

The light intensity distribution 112 of the reconstructed light beam has three peaks with the two intensity distributions 105 and 106 overlapped, but two peaks without the distributions 105 and 106 overlapped. In order to detect a narrow obstacle such as a pole also at the center of the light beam, a light beam, which is formed from two intensity distributions 105 and 106 largely overlapped so as to have the light intensity distributions with three peaks, is preferably used.

Figure 7:
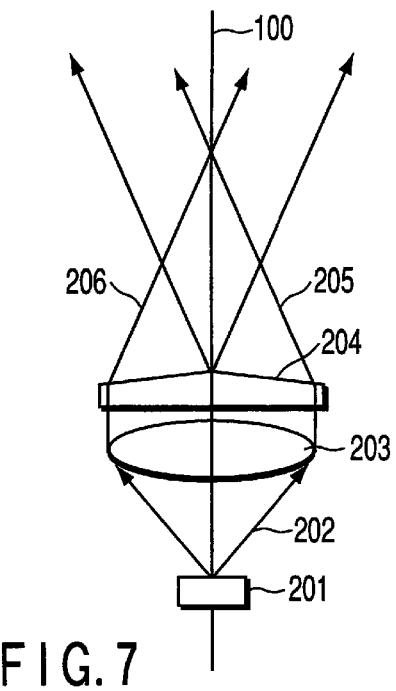
FIG. 7 schematically shows an example of the light transmission optical system of the distance measuring apparatus according to the second embodiment.

An example of the light transmission optical system according to the present embodiment comprises a light source 201 for emitting a divergent light beam 202 having the Gaussian intensity distribution, a lens 203 for collimating the divergent light beam from the light source 201, and a prism 204 for splitting the collimated or parallel light beam into two beams and deflecting them, as shown in FIG. 7.

The divergent light beam emitted from the light source 201 is collimated by the lens 203, and then strikes on the prism 204. The prism 204, which has a pair of apical angles symmetrical with respect to the optical axis 100, deflects the light beam at the right half of the pupil in a direction of an arrow 205 and the light beam at the left half of the pupil in a direction of an arrow 206.

That is, the prism 204 splits the parallel light beam having the Gaussian intensity distribution into two beams and deflects each of them inwardly, in other words, in the direction symmetrical with respect to the optical axis. An angle between the two split and deflected light beams is defined on the basis of the apical angles of the prism 204 and is about three degrees as mentioned above. With this operation, the intensity distribution 112 shown in FIG. 6 is obtained at a position about 30 m ahead.

Figure 8:
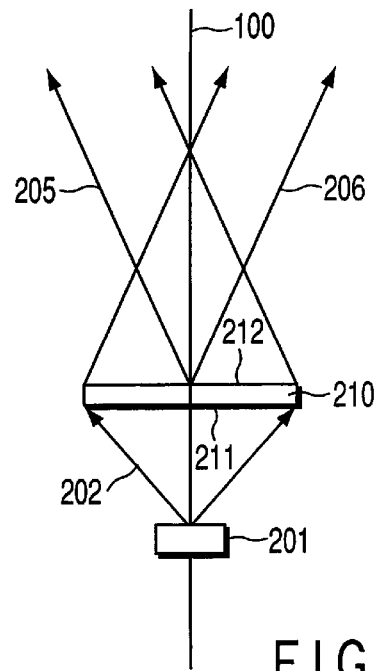
FIG. 8 schematically shows another example of the light transmission optical system of the distance measuring apparatus according to the second embodiment.

Another example of the light transmission optical system according to the present embodiment comprises the light source 201 for emitting the divergent light beam 202 and an optical element 210 for collimating the divergent light beam 202 from the light source 201, splitting the light beam 202 into two beams and deflecting the two beams, as shown in FIG. 8. The optical element 210 comprises, for example, a optical transparent plate crossing the optical axis 100, the plate having a surface 211 nearer the light source 201 on which a Fresnel lens is formed, and another surface 212 farther from the light source 201 on which a linear Fresnel lens is formed. The linear Fresnel lens, which has an optical function corresponding to the prism 204 of FIG. 7, is formed by arranging a plurality of microscopic prisms having an apical angle corresponding to the apical angle of the prism 204. That is, the linear Fresnel lens has a pair of linear Fresnel lens portions arranged symmetrically with respect to the optical axis, and each of the linear Fresnel lens portions has a number of microscopic prisms having an apical angle symmetrical with respect to the optical axis.

The light beam emitted from the light source 201 is collimated by the Fresnel lens formed on the surface 211, the right half of the pupil is deflected in the direction of the arrow 205 by the linear Fresnel lens formed on the surface 212, and the left half of the pupil is deflected in the direction of the arrow 205. Therefore, the intensity distribution 112 shown in FIG. 6 is obtained at a position about 30 m ahead.

Figure 9:
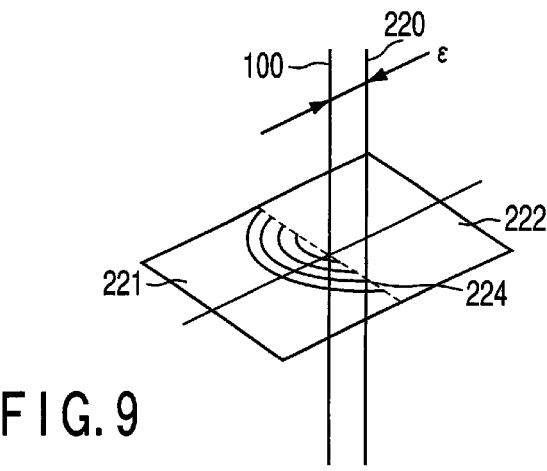
FIG. 9 shows an optical element which may be applied instead of a flat optical element shown in FIG. 8.

FIG. 9 shows another optical element applicable instead of the optical element 210 shown in FIG. 8. This optical element comprises a combination of two eccentric Fresnel lenses 221 and 222 symmetrical with respect to a central line 224. A center 220 of the Fresnel lens 221 is eccentric by a distance ϵ from the optical axis 100 in a direction and, a center of the Fresnel lens 222 is eccentric by a distance ϵ from the optical axis 100 in a reverse direction. That is, the optical element comprises a pair of Fresnel lenses 221 and 222 symmetrically eccentric with respect to the optical axis 100.

Figure 10:
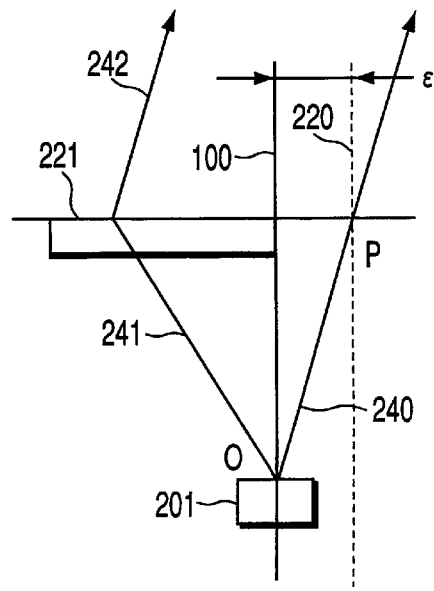
FIG. 10 shows a function of one of a pair of Fresnel lenses shown in FIG. 9.

As understood from FIG. 10, a light ray 241 incident on the Fresnel lens 221, of the divergent light beams emitted from the light source 201, is deflected to be a light ray 242 parallel to a straight line OP passing through both a center 0 of the light source 201 and a center P of the Fresnel lens 221. An inclination angle of the straight line OP with respect to the optical axis 100 is, for example, about two degrees.

The light ray incident on the Fresnel lens 222 is deflected symmetrically with this. For this reason, the intensity distribution 112 shown in FIG. 6 is obtained at a position about 30 m ahead.

In FIG. 9, the eccentric Fresnel lens 221 may be replaced with an non-eccentric Fresnel lens and a diffraction grating blazed in a direction of +1 order, which are mutually overlapped, and the eccentric Fresnel lens 222 may be replaced with an non-eccentric Fresnel lens and a diffraction grating blazed in a direction of −1 order, which are mutually overlapped.

After collimated by the Fresnel lens, for example, a light beam portion on the left side of the optical axis is diffracted in a right direction by the diffraction grating blazed in the direction of +1 order, and a light beam portion on the right side of the optical axis is diffracted in a left direction by the diffraction grating blazed in the direction of −1 order, and, therefore, the intensity distribution 112 shown in FIG. 6 is obtained.

By using the intensity distribution 112 shown in FIG. 6, a minimum area required for recognition of the danger in the collision against an obstacle and judgment of driving of the life protecting device is monitored at optimal costs.

[Third Embodiment]

The distance measuring apparatus of the third embodiment has a light transmission optical system, which forms a light beam with emphasized edges by splitting a single light beam having the Gaussian intensity distribution into three light beams and reconstructing them, and transmits the reconstructed light beam. The light beam with the emphasized edges corresponds to the above-mentioned light beam 22 having the light intensity distribution with a pair of peaks and, thus, composition of the three split light beams forms the above-mentioned light beam 22 having the light intensity distribution with a pair of peaks in the light transmission optical system of the present embodiment.

In the following description, the light beam with emphasized edges, and then a specific structure of the light transmission optical system for transmitting the light beam with emphasized edges, will be described.

Figure 11:
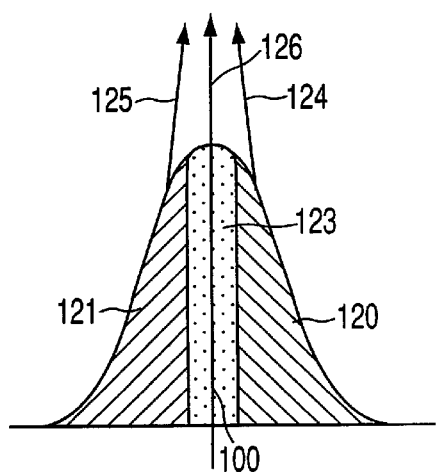
FIG. 11 shows intensity distribution of light beam at a pupil of a light transmission optical system, in a distance measuring apparatus according to the third embodiment.

FIG. 11 shows the Gaussian light intensity distribution of the light beam at the pupil portion of the light transmission optical system. The light beam is split into a central portion 123, a right portion 120 and a left portion 121, with reference to the optical axis 100. The central portion 123 is transmitted in a direction of an arrow 126, i.e. advances straight, the right portion 120 is transmitted in a direction of an arrow 124, and the left portion 121 is transmitted in a direction of an arrow 125.

Figure 12:
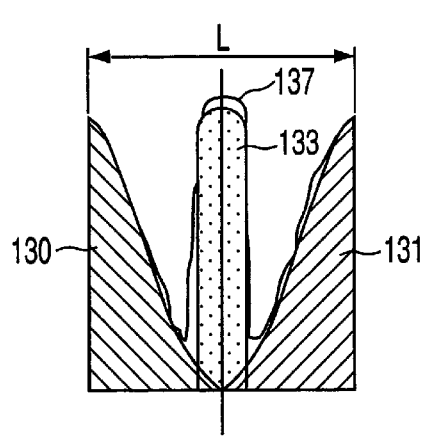
FIG. 12 shows intensity distribution of light beam about 30 m ahead of the light transmission optical system, in a distance measuring apparatus according to the third embodiment.

FIG. 12 shows the intensity distribution of the light beam at the above-mentioned position in a short distance, i.e. about 30 m remote along the optical axis 100 of the light transmission optical system. An intensity distribution 130 of the left side, an intensity distribution 131 of the right side, and an intensity distribution 133 of the center are formed by propagation of the right portion 120, the left portion 121, and the central portion 123 of the light beam, respectively, and the light beam has, therefore, an intensity distribution 137 with three peaks as a whole body.

The left intensity distribution 130 and the right intensity distribution 131 have acute edges, respectively, and the interval between their peaks is the distance L corresponding to an area in which the degree of danger to life is high in the collision against an obstacle, i.e. about 1 m. An angle between the right portion 120 and the left portion 121, shown in FIG. 11, of the light beam is selected so that the intensity distribution 137 shown in FIG. 12 is obtained at a position 30 m ahead.

When an obstacle crosses the light beam having the intensity distribution 137 with the acute edges at both sides, scattered light having enough intensity is immediately generated. In other words, the transitionally unstable measurement period is remarkably shortened.

In addition, since the intensity distribution 137 of the light beam has three peaks, a narrow obstacle such as a pole at the center far from the automobile is also detected, i.e. the light beam does not miss an obstacle.

Figure 13:
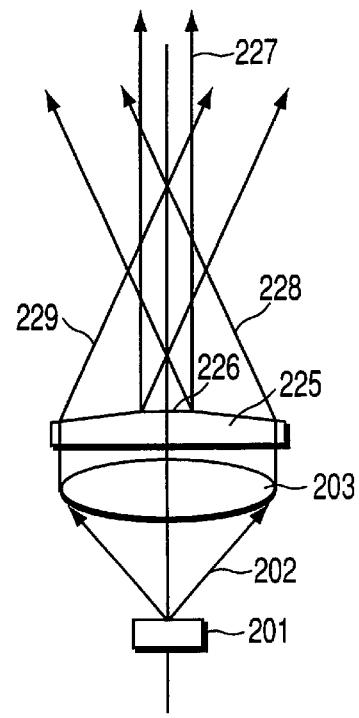
FIG. 13 schematically shows an example of the light transmission optical system of the distance measuring apparatus according to the second embodiment.

An example of the light transmission optical system according to the present embodiment comprises a light source 201 for emitting a divergent light beam 202, a lens 203 for collimating the divergent light beam 202 from the light source, and a prism 225 for splitting the collimated or parallel light beam into three beams and deflecting the two split side light beams, as shown in FIG. 13. The prism 225 has a plane 226 perpendicular to the optical axis at the central portion crossing the optical axis, and also has a pair of inclined surfaces symmetrical with respect to the optical axis at both sides of the plane 226.

The light beam emitted from the light source 201 is collimated by the lens 203, and then strikes on the prism 225. The prism 225 allows the light beam passing through the plane 226 to advance straight in a direction of an arrow 227, the light beam passing through the right inclined surface to be deflected in a direction of an arrow 228, and the light beam passing through the left inclined surface to be deflected in a direction of an arrow 229.

Therefore, the intensity distribution 137 shown in FIG. 12 is obtained at a position about 30 m ahead. The intensity of the light beam which advances straight is adjusted in accordance with the width of the plane 226 perpendicular to the optical axis.

Figure 14:
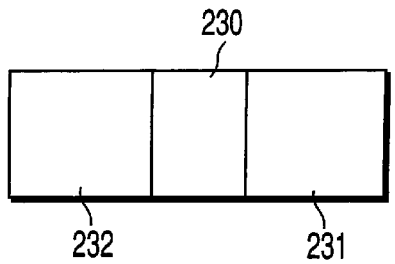
FIG. 14 shows optical elements which may be applied instead of a lens and a prism shown in FIG. 13.

FIG. 14 shows an optical element applicable instead of the lens 203 and the prism 225 shown in FIG. 13. The optical element comprises a combination of three Fresnel lenses 230, 231 and 232. The Fresnel lens 230 is not eccentric, the Fresnel lens 231 of the right side has its center eccentric to the left side of the optical axis, and the Fresnel lens 232 of the left side has its center eccentric to the right side of the optical axis. That is, this optical element has the non-eccentric Fresnel lens crossing the optical axis, and a pair of Fresnel lenses eccentric symmetrically with respect to the optical axis, positioned at both sides of the non-eccentric Fresnel lens.

As can be easily understood with reference to FIGS. 9 and 10, the non-eccentric Fresnel lens does not deflect the light beam which passes therethrough, and the eccentric Fresnel lenses deflect the light beam which passes therethrough, in a direction symmetrical to the optical axis. Therefore, even when the optical element is used instead of the lens 203 and prism 225 shown in FIG. 13, the intensity distribution 137 shown in FIG. 12 is of course obtained at a position about 30 m ahead.

By using the intensity distribution 137 shown in FIG. 7, a minimum area required for recognition of the danger in the collision against an obstacle and judgment of driving of the life protecting device is monitored at optimal costs.

[Fourth Embodiment]

Figure 15:
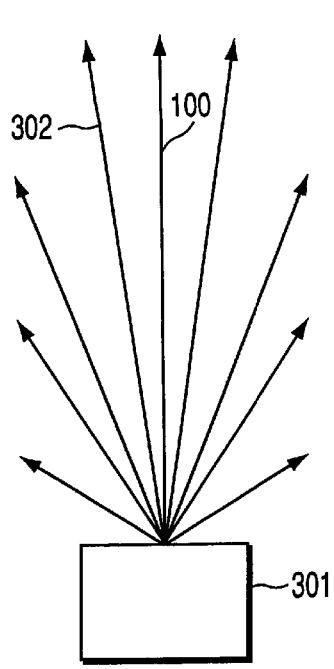
FIG. 15 shows a large number of thin light beam transmitted from the distance measuring apparatus according to a fourth embodiment.
Figure 16:
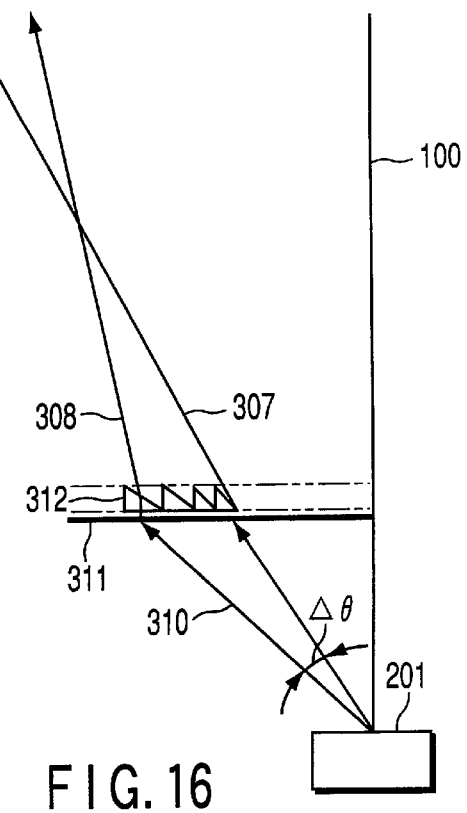
FIG. 16 is a view schematically showing an example of the light transmission optical system of the distance measuring apparatus according to the fourth embodiment.

A distance measuring apparatus 301 according to the fourth embodiment transmits a number of thin light beams 302 symmetrically extending with respect to the optical axis 100, as shown in FIG. 15. The apparatus 301 monitors, at the above-mentioned position in a short distance, an area obtained by connecting tops of allows indicating the thin light beams 302, which has a width corresponding to that of an automobile. The thin light beam 302 forming a larger angle to the optical axis 100 has a higher light intensity.

The light transmission optical system for transmitting a large number of thin light beams 302 comprises a light source 201 for emitting a divergent light beam 310, a Fresnel lens 311 for collimating the light beam 310 from the light source 201, and a linear Fresnel lens 312 for splitting the light beam 310 into a large number of thin light beams and deflecting the respective split thin light beams in different directions.

The linear Fresnel lens 312 comprises a large number of microscopic prisms. The microscopic prisms farther from the optical axis 100 have smaller apical angles. For this reason, a thin light beam 307 nearer to the optical axis 100 has a larger angle of deflection than a thin light beam 308 farther from the optical axis 100.

In other words, light rays incident on the same microscopic prism of the linear Fresnel lens 312 are deflected in the same direction to form a thin light beam. The thin light beams formed in the respective microscopic prisms have different angles of deflection, and the thin light beams nearer to the optical axis 100 have larger angles of deflection.

The light beam 310 emitted from the light source 201 has the Gaussian intensity distribution and, therefore, the thin light beams having larger angles with respect to the optical axis 100 has higher light intensities. That is, the light beam formed of a large number of thin light beams entirely has the light intensity distribution which is high at the outer side and low at the inner side. The light intensity distribution has steep edges at both sides, which is suitable for monitoring of a minimum area required for recognition of the danger in the collision against an obstacle and judgment of driving of the life protecting device.

In the above-descried embodiment, the feet of the light intensity distribution preferably fall as rapidly as possible from the peak position toward the outer side, and extend within less than half of the quantity obtained by subtracting the above-mentioned distance L from the width of the automobile. Specifically, when the width of the automobile is 1.7 m and L is 1 m, the feet preferably are within (1.7 m−1 m)/2=0.35 m, which is, in other words, equivalent to less than 20% of the width of the automobile.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measuring apparatus, adapted to be mounted on a vehicle, for measuring a distance to an obstacle, the apparatus comprising:

a light transmission optical system that transmits a light beam having an intensity distribution with at least two peaks; and a reception system that measures the distance to the obstacle based on reflected light from the obstacle;

wherein positions of the two peaks of the intensity distribution correspond to both sides of an area of the vehicle in which a degree of danger to life is high if a collision between the vehicle and the obstacle were to occur; and wherein the light transmission optical system comprises a light source that emits a light beam having a Gaussian intensity distribution along an optical axis, a collimator that collimates the light beam emitted by the light source, a beam splitter that splits the collimated light beam into a plurality of light beams, and a deflector that deflects the split light beams in directions symmetrical with respect to the optical axis such that a composition of the plurality of split light beams forms the light beam having the intensity distribution with at least two peaks.

2. A distance measuring apparatus according to claim 1, wherein an interval between the two peaks of the intensity distribution is approximately 1 m.

3. A distance measuring apparatus according to claim 1, wherein the intensity distribution includes feet at respective side portions, and the feet fall within a width of the vehicle.

4. A distance measuring apparatus according to claim 3, wherein the feet extend between a distance that is less than 20% of the width of the vehicle.

5. A distance measuring apparatus according to claim 1, wherein the beam splitter splits the collimated light beam into two light beams.

6. A distance measuring apparatus according to claim 5, wherein:

the collimator comprises a lens that collimates the light beam from the light source, the beam splitter and the deflector commonly comprise a prism having a pair of apical angles and inclined surfaces symmetrical with respect to the optical axis, and the prism splits the collimated light beam from the lens into the two light beams and deflects the two split light beams in directions symmetrical with respect to the optical axis.

7. A distance measuring apparatus according to claim 5, wherein:

the light transmission optical system includes a transparent plate crossing the optical axis, the collimator comprises a Fresnel lens formed on a first surface of the transparent plate proximal to the light source, and a pair of linear Fresnel lenses formed on a second surface of the transparent plate distal from the light source, and the Fresnel lens formed on the first surface of the transparent plate collimates the light beam from the light source, and the pair of linear Fresnel lenses formed on the second surface of the transparent plate split the collimated light beam into the two light beams and deflect the two split light beams in directions symmetrical with respect to the optical axis.

8. A distance measuring apparatus according to claim 5, wherein:

the collimator, the beam splitter and the deflector commonly comprise a pair of Fresnel lenses that are symmetrically eccentric with respect to the optical axis, and the pair of Fresnel lenses collimate the light beam from the light source, split the light beam from the light source into the two light beams, and deflect the two split light beams in directions symmetrical with respect to the optical axis.

9. A distance measuring apparatus according to claim 5, wherein the collimator, the beam splitter and the deflector commonly comprise a Fresnel lens that is non-eccentric with respect to the optical axis and a pair of diffraction gratings blazed symmetrically with respect to the optical axis, the Fresnel lens collimates the light beam from the light source, and the pair of blazed diffraction gratings split the collimated light beam into the two light beams and deflect the two split light beams in directions symmetrical with respect to the optical axis.

10. A distance measuring apparatus according to claim 1, wherein the beam splitter splits the collimated light beam into three light beams.

11. A distance measuring apparatus according to claim 10, wherein:

the collimator comprises a lens that collimates the light beam from the light source, the beam splitter and the deflector commonly comprise a prism having a plane perpendicular to and crossing the optical axis, and first and second inclined faces symmetrical with respect to the optical axis and positioned on opposite sides of the plane, and the plane transmits a portion of the collimated light beam passing therethrough without deflection as a first beam, and the pair of inclined faces deflect respective portions of the collimated light beam passing therethrough in directions symmetrical with respect to the optical axis as second and third beams, respectively.

12. A distance measuring apparatus according to claim 10, wherein:

the collimator and the beam splitter commonly comprise a non-eccentric Fresnel lens crossing the optical axis, and first and second Fresnel lenses symmetrically eccentric with respect to the optical axis and positioned on opposite sides of the non-eccentric Fresnel lens, and the non-eccentric Fresnel lens transmits without deflection a portion of the light beam from the light source passing therethrough as a first beam, while the pair of eccentric Fresnel lenses deflect respective portions of the light beam from the light source passing therethrough as second and third beams, respectively.

13. A distance measuring apparatus according to claim 1, wherein the beam splitter splits the collimated light beam into a plurality of thin light beams.

14. A distance measuring apparatus according to claim 13, wherein respective ones of the thin light beams having a larger refracted angle with respect to the optical axis have a higher light intensity.

15. A distance measuring apparatus according to claim 13, wherein:

the collimator comprises a Fresnel lens that collimates the light beam from the light source, the splitter and the deflector commonly comprise a linear Fresnel lens having a plurality of microscopic prisms, and respective ones of the microscopic prisms nearer to the optical axis have larger apical angles so as to deflect respective portions of the collimated light beam passing therethrough with a larger diffraction angle.

* * * * *